United States Patent [19]
Sakai

[11] Patent Number: 4,776,781
[45] Date of Patent: Oct. 11, 1988

[54] OPEN-END BLADDER FOR VULCANIZATION OF PNEUMATIC TIRE

[75] Inventor: Nobuhiro Sakai, Tokyo, Japan

[73] Assignee: Bridgestone Corporation, Tokyo, Japan

[21] Appl. No.: 105,060

[22] Filed: Oct. 6, 1987

[51] Int. Cl.⁴ ............................................. B29C 35/00
[52] U.S. Cl. ...................................................... 425/48
[58] Field of Search ...................... 425/35, 36, 48, 49, 425/51, 52, 58, 53

[56] References Cited
FOREIGN PATENT DOCUMENTS

| | | |
|---|---|---|
| 57-32932 | 2/1982 | Japan . |
| 57-24211 | 5/1982 | Japan . |
| 61-225033 | 10/1986 | Japan . |

*Primary Examiner*—Bernard Nozick
*Attorney, Agent, or Firm*—Sughrue, Mion, Zinn, Macpeak & Seas

[57] ABSTRACT

An open-end bladder for vulcanizing a pneumatic tire. The bladder has an annular form and a pair of opening extending through the bladder in the axial direction of the bladder. A pressure fluid is introduced into the bladder to bring it into pressure contact with the still unvulcanized tire to preshape it and to support the tire on the inside surface of the tire at the same time of the vulcanization. The bladder comprises corners extending outward from both metal-clamped end portions having the openings, first oblique portions curved and extending outward from the corners, second oblique portions extending outward from the first oblique portions, and a convex portion curved and extending outward from the second oblique portions to the maximum-diameter cross section of the bladder to couple the upper and lower halves of the bladder to each other. The thickness of the bladder is gradually decreased from the portions of the bladder, which correspond to the beads of the still unvulcanized tire, to the portion of the bladder, which corresponds to the tread of the still unvulcanized tire.

2 Claims, 6 Drawing Sheets

TIME OF THE PRESHAPING PASSES (SECOND)

TIME OF THE PRESHAPING PASSES (SECOND)

OPEN-END BLADDER FOR VULCANIZATION OF PNEUMATIC TIRE

BACKGROUND OF THE INVENTION

The present invention relates to an open-end bladder for the vulcanization of a pneumatic tire, particularly to an open-end bladder which is uniformly expanded to uniformly apply pressure to the entire inside surface of an unvulcanized tire and keep the tire in a prescribed position on the inside surface of vulcanizing molds in preshaping the unvulcanized tire in conformity with the molds.

A conventional bladder is used to press an unvulcanized tire on vulcanizing molds to vulcanize the tire through the use of a fluid of high temperature and pressure to form the beads, side walls and tread of the tire, whether the tire is a bias-ply tire, a radial-ply tire or the other. During the period of time from the insertion of the bladder into the unvulcanized tire to the vulcanization thereof, the bladder supports the unvulcanized tire on the inside surface thereof and expands the tire to properly hold the tire on the inside surfaces of the vulcanizing molds to preshape the tire. The vulcanizing molds are completely closed on each other at timing set relative to the end of the preshaping. When the molds are completely closed on each other, the heating fluids such as steam is introduced into the molds and the bladder.

At the time of the preshaping, an inactive gas such as air, carbon dioxide and nitrogen is introduced as an expanding medium into the bladder. At the time of the vulcanization, the heating fluid such as steam is introduced into the bladder to replace the expanding medium therein. The pressure of the heating fluid introduced into the bladder for the vulcanization is higher than that of the expanding medium introduced into the bladder for the preshaping and acts to press the unvulcanized tire on each of the tire tread patterning projections and recesses of the inside surfaces of the vulcanizing molds. In other words, the heating fluid of high pressure and temperature is introduced into the bladder to expand the bladder to bring the unvulcanized tire into tight contact with the inside surfaces of the vulcanizing molds at the time of the vulcanization of the unvulcanized tire.

Such bladders are classified into the closed-end type in which the lower end of the bladder is open, and the open-end type in which the upper and lower ends of the bladder are open.

Figure 1:
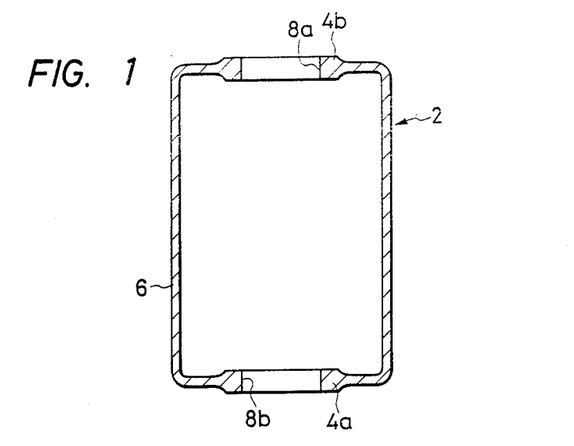
FIG. 1 shows a longitudinally sectional view of a conventional open-end bladder.

FIG. 1 shows a conventional open-end bladder 2. Since the bladder 2 is engaged with vulcanizing molds not shown in the drawing, the metal-clamped portions 4a and 4b of the bladder are provided with a large thickness. However, the body 6 of the bladder, which corresponds to the side walls and tread of a tire, is provided with a uniform thickness. The outside surface of the body 6 is usually provided with air release grooves. At 8a and 8b in FIG. 1 are openings which extend through the bladder 2 in the axial direction thereof.

Figure 2A:
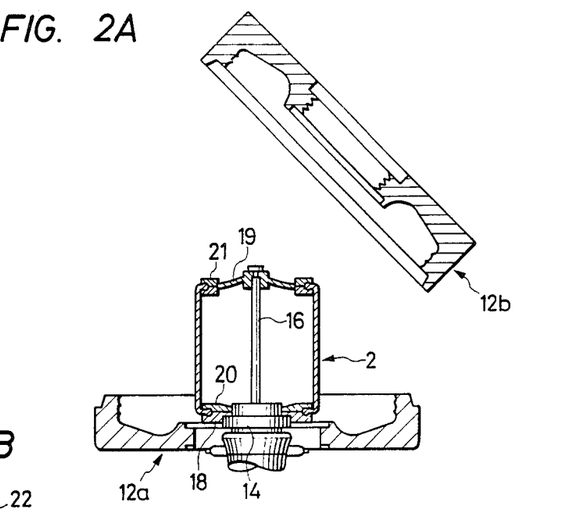
FIGS. 2A, 2B and 2C show views for describing the process of preshaping an unvulcanized tire by using the conventional open-end bladder.
Figure 2B:
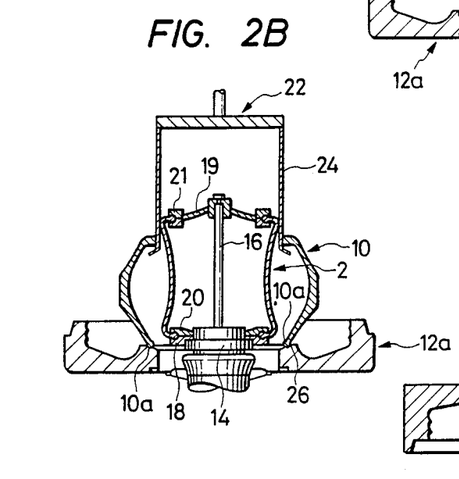
Figure 2C:
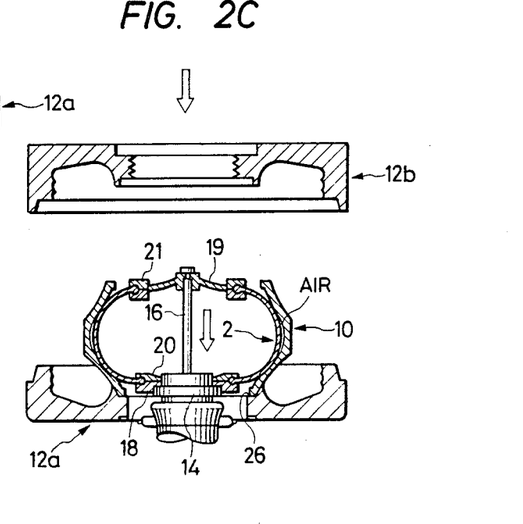

A series of steps to be taken to preshape the tire by using the conventional bladder 2 are described now with reference to FIGS. 2A, 2B and 2C. A disk-shaped member 14 is secured at the center of a lower mold 12a which is for vulcanizing the unvulcanized tire 10. A center rod 16 extends from a cylinder (not shown in the drawings) through the central portion of the secured member 14 so that the center rod can be moved vertically. The secured member 14 has a fluid passage (not shown in the drawings) for introducing a preshaping pressure fluid such as air into the bladder 2. A disk-shaped plate 18 is engaged with the secured member 14. An attaching metal 20, whose top slightly sloped down toward the center thereof, is secured to the top of the plate 18. A disk-shaped plate, whih slightly slopes down toward the periphery thereof, is engaged with the center rod 16 near the upper end thereof. An attaching metal 21 is secured to the peripheral edge of the plate 19. The metal-clamped portion 4a of the bladder 2 is pinched between the plate 18 and the attaching metal 20, while the other metal-clamped portion 4b of the bladder is engaged with the attaching metal 21. The bladder 2 is thus set. At that time, an upper mold 12b is located over the lower mold 12a, and the bladder 2 keeps its original form, as shown in FIG. 2A. After that, the cylinder is driven to move up the center rod 16 to elongate the bladder 2, and the interior of the bladder is evacuated through an air passage not shown in the drawings. As a result, the middle portion of the bladder 2 is concaved so that the bladder is prevented from coming into contact with the unvulcanized tire 10. The unvulcanized tire 10 hung from the diameter-reducible plate 24 of a loader 22 is then moved down so that the bead 10a of the tire is positioned on the circumferential fitting portion 26 of the lower mold 12a. The center rod 16 is thereafter moved down. Air is introduced into the bladder 2 through the air passage at timing set relative to the moving-down of the center rod 16, so that the bladder is expanded into pressure contact with the inside surface of the unvulcanized tire 10. The upper mold 12b is then moved down so that the upper and the lower molds 12b and 12a enclose the unvulcanized tire 10. A vulcanizing fluid is then introduced into the bladder 2.

Figure 3A:
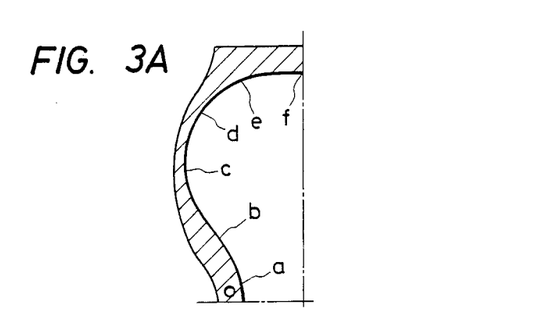
FIG. 3A shows a view for describing the distribution of pressure on the contact surfaces of the unvulcanized tire and the bladder shown in FIGS. 2A, 2B and 2C.
Figure 3B:
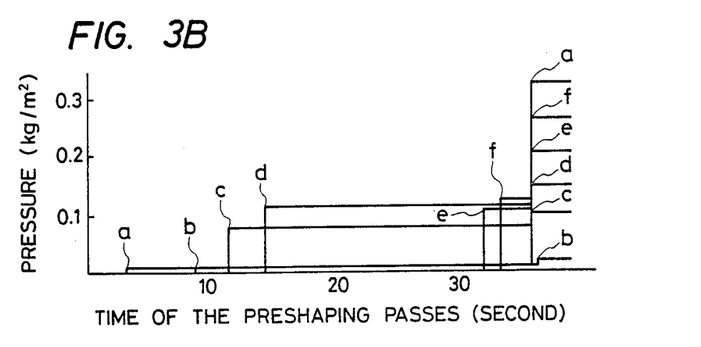
FIG. 3B shows diagrams for describing the distribution of pressure on the contact surfaces of the unvulcanized tire and the bladder shown in FIGS. 2A, 2B and 2C.

However, since the bladder 2 has the above-described form, a pressure difference arises between a portion of each of the bladder 2 and the unvulcanized tire 10 and another portion of each of them at the time of the introduction of the expanding gas into the bladder, and the time which it takes to preshape the tire differs from portion to portion, as shown in FIGS. 3A and 3B. The reference symbols indicating the portions of the tire 10 in FIG. 3A correspond to those in FIG. 3B. It is understood from FIGS. 3A and 3B that the pressure contact point of the bladder 2 on the tire 10 moves from the bead of the tire toward the center of the tread thereof as the time of the preshaping passes. The pressure on the tire 10 much differs from portion to portion so that the pressure difference arises between the portions of the tire at the end of the preshaping, as shown in FIG. 3B.

The conventional bladder 2 has problems described from now on. Since the bladder 2 has the above-described form, air is hermetically enclosed it between the outside surface of the bladder and the inside surface of the unvulcanized tire 10, as shown in FIG. 2C, when the expanding medium is introduced into the bladder. As a result, the outside surface of the vulcanized tire is made rugged at the place of the hermetic enclosure of the air to make the vulcanized tire defective. In a tire forming process in which the components of the tire are piled up as layers, the hermetically enclosed air is not released but remains in the tire because the beads of the tire are sealed in the preshaping of the tire. In other words, the air is enclosed in between the rubber, cords and the like of the vulcanized tire, which not only makes the tire into a defective product but also is likely to lead to an accident if the tire is put into practical use. Because of such problems, it is inevitable that more strict quality control is done and the process of production of the tire is complicated. Besides, since the bladder 2 is expanded into pressure contact with the portions of the inside surface of the unvulcanized tire 10 under different levels of pressure thereon during the preshaping the tire, the bladder is sometimes improperly positioned in contact with the inside surface of the unvulcanized tire. For that reason, the inside surface of the tire is wrinkled, and the tire is unstably preshaped to improperly form each bead of the tire to make the tire defective.

SUMMARY OF THE INVENTION

The present invention was made in order to solve the above-mentioned problems.

Accordingly, it is an object of the present invention to provide an open-end bladder for the vulcanization of a pneumatic tire. The longitudinally sectional form of each of the upper and lower pressure-elongated portions of the bladder is curved and projects in the axial direction of the bladder so that the wall of the bladder uniformly presses the unvulcanized tire almost simultaneously as to all the parts of the bladder, when a pressure fluid is introduced into the bladder to expand it. The bladder and the tire are prevented from slipping relative to each other, the tire is properly preshaped and the tire is brought into uniform contact with vulcanizing molds when the unvulcanized tire is expanded by the expanded bladder.

The open-end bladder provided in accordance with the present invention has an annular form and a pair of openings extending through the bladder in the axial direction thereof. The pressure fluid is introduced into the bladder to bring the bladder into pressure contact with the unvulcanized tire to preshape the unvulcanized tire and to support the unvulcanized tire on the inside surface thereof at the time of the vulcanization of the tire. The open-end bladder is characterized in that the bladder comprises corners extending outward from both metal-clamped end portions having the openings, first oblique portions curved and extending outward from the corners, second oblique portions extending outward from the first oblique portions, and a convex portion curved and extending outward from the second oblique portions to the maximum-diameter cross section of the bladder to couple the upper and lower halves of the bladder to each other; and the thickness of the bladder is gradually decreased from the portions of the bladder, which correspond to the beads of the unvulcanized tire, to the portion of the bladder, which corresponds to the tread of the unvulcanized tire.

Since the bladder is uniformly expanded by the introduction of the pressure fluid into the bladder so that the bladder is uniformly elongated as a whole in preshaping the unvulcanized tire, the pressure applied to the bladder is made uniform and the time which it takes to apply the pressure to the bladder is shortened.

Since the bladder is uniformly elongated, the pressure which the bladder exerts on the unvulcanized tire is made uniform as to all their portions and unnecessary air is prevented from flowing in between the bladder and the unvulcanized tire. For that reason, the bladder does not need to be provided with grooves for releasing the air, so that the constitution of the bladder is simplified and the bladder is more uniformly elongated.

Since the thickness of the bladder at the time of the expansion thereof is made uniform and small, the time which it takes to vulcanize the tire is shortened and the ratio of occurrence of defective products is decreased.

Since the bladder does not need to be provided with the air release grooves, the finished tire and a pneumatic tube are disposed in tight contact with each other when the tire is attached to a vehicle. For that reason, it is more likely that the tire is protected from an accident such as puncture.

Since a decrease in weight is made by a quantity corresponding to the thickness of the protrusion of a protruded and recessed portion constituting an inner liner, a further reduction in cost and an enhancement of tire quality are enabled.

Since no excessive expansive pressure is locally applied, the bladder is so strong against repeated fatigue that the durability of the bladder is very high.

DETAILED DESCRIPTION OF EXEMPLARY EMBODIMENT

A preferred embodiment of the present invention, which is an open-end bladder, is hereafter described in detail with reference to the drawings attached hereto.

Figure 4:
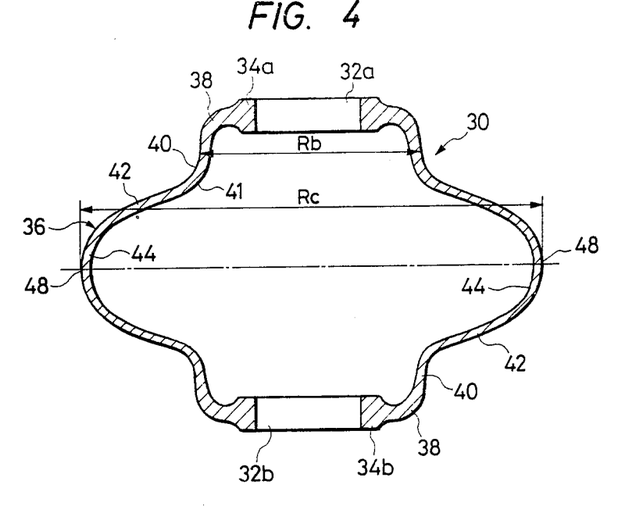
FIG. 4 shows a longitudinally sectional view of an expanded open-end bladder which is an embodiment of the present invention.
Figure 5:
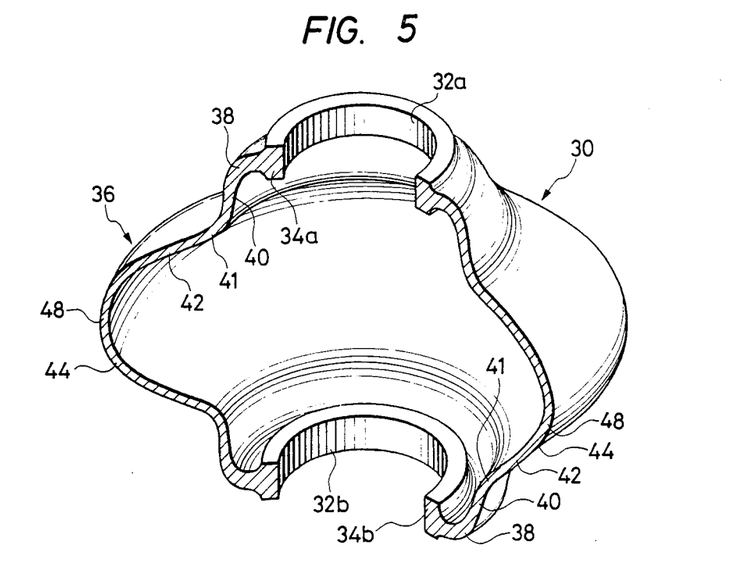
FIG. 5 shows a cutaway perspective view of the open-end bladder which is the embodiment.

Shown at 30 in FIGS. 4 and 5 is the open-end bladder which has openings 32a and 32b extending through the upper and the lower ends of the bladder in the axial direction thereof. The openings 32a and 32b are located in metal-clamped portions 34a and 34b whose sectional form along the axis of the bladder 30 is nearly pentagonal and whose sectional form perpendicular to the axis of the bladder is annular. The thickness of each of the metal-clamped portions 34a and 34b is larger than that of any other portion of the bladder 30. The body 36 of the bladder 30 is made of an expansible material such as butyl rubber and formed integrally with the metal-clamped portions 34a and 34b and extends therefrom. The bladder body 36 includes corners 38 extending outward from the metal-clamped portions 34a and 34b, and first oblique portions 40 slightly divergently extending from the corners. The corners 38 have curved portions extending from the metal-clamped portions 34a and 34b to the first oblique portions 40. The first oblique portions 40 are connected to second oblique portions 42 of large extension through curved portions 41, the center of curvature of which is located outside the bladder body 36. The bladder body 36 further includes a curved portion 44 extending from the second oblique portions 42 to the central cross section of the bladder body. The center of curvature of the curved portion 44 is located inside the bladder body 36.

Figure 6:
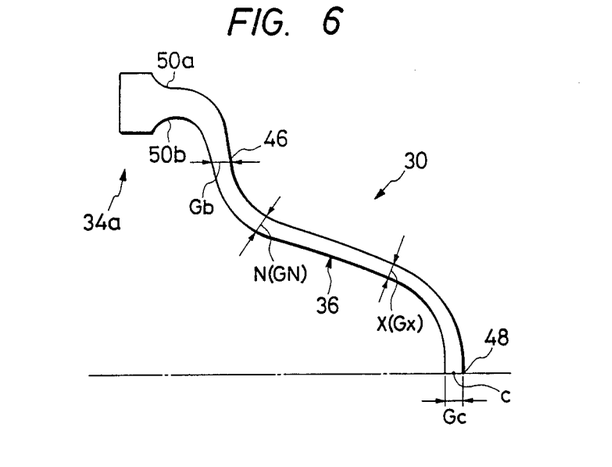
FIG. 6 shows a view for describing the length and thickness of the bladder which is the embodiment from the end of the bladder to the central part thereof.

The portion of the bladder 30 are now described in detail. The part 46 of the bladder body 36, which is included in the first oblique portion 40 and comes into contact with the bead of an unvulcanized tire, is set at a thickness Gb larger than that Gc of the outermost part of the curved portion 44 or that Gc of the central part 48 of the bladder body 36, as shown in FIG. 6. The thickness of the bladder body 36 is gradually decreased from the part 46 to the central part 48. The thickness of the bladder body 36 is thus set so that a negative linear correlation is established between the thickness and the distance from the part 46 of the bladder body, which corresponds to the bead of the unvulcanized tire. In other words, the thickness of the bladder body 36 is set to establish a formula as follows:

$$\frac{Gx - Gn}{Lx - Ln} = \frac{Gc - Gn}{Lc - Ln}$$

In the formula, Gn and Gx denote the thickness of the bladder body 36 at arbitrary points N and X between the part 46 of the bladder body and the central part 48 thereof, and Ln and Lx denote the distances from the part 46 to the points N and X along the center of the thickness. It was confirmed through an experiment that effects mentioned hereinafter are produced by the present invention when the difference Gb−Gc is 1 mm or more and the difference Rc−Rb between the outside diameter Rc of the central part 48 and that Rb of the part 46 corresponding to the bead of the tire is 100 mm or more (refer to FIG. 4).

Figure 7A:
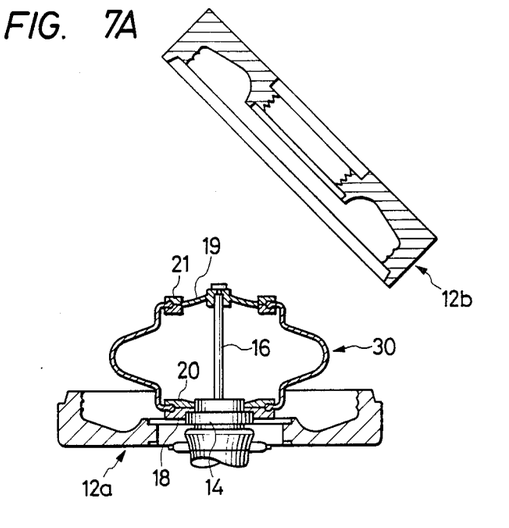
FIGS. 7A, 7B and 7C show views for describing the process of preshaping an unvulcanized tire by using the open-end bladder which is the embodiment.
Figure 7B:
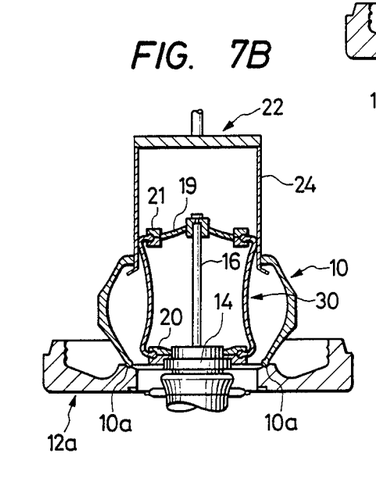
Figure 7C:
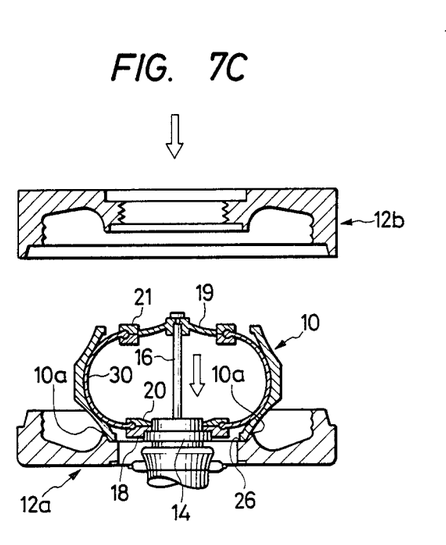
Figure 8A:
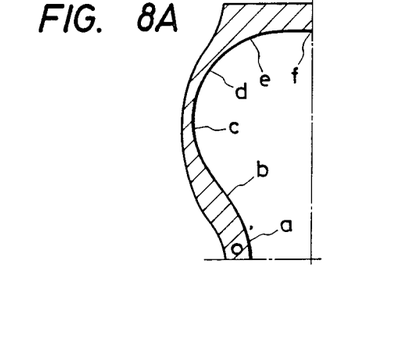
FIG. 8A shows a view for describing the distribution of pressure on the contact surfaces of the unvulcanized tire and the bladder which is the embodiment.
Figure 8B:
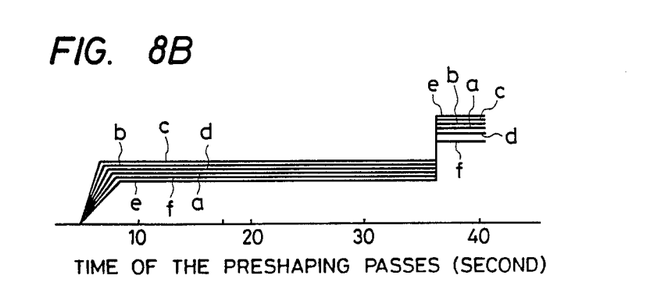
FIG. 8B shows diagrams for describing the distribution of pressure on the contact surfaces of the unvulcanized tire and the bladder which is the embodiment.

The process of vulcanizing the unvulcanized tire by using the bladder 30 basically constructed as described above is now described with reference to FIGS. 7A, 7B and 7C. The same reference symbols in FIGS. 2A, 2B, 2C, 7A, 7B and 7C show the same components. The metal-clamped portions 34a and 34b of the bladder 30 are positioned and secured to annular attaching metals 20. At that time, the height of a center rod 16 remains adjusted by a cylinder (not shown in the drawings) so that the bladder 30 keeps its original form, as shown in FIG. 7A. The cylinder is then driven to move up the center rod 16 to elongate the bladder 30 vertically. The interior of the bladder 30 is evacuated through an air passage (not shown in the drawings) to concave the middle portion of the bladder 30 to prevent the bladder from coming into contact with the unvulcanized tire 10. The unvulcanized tire 10 hung from a loader 22 is thereafter moved down so that the unvulcanized tire having a center opening whose diameter is larger than that of the bladder 30 reaches a lower mold 12a while keeping the original form of the tire and not coming into contact with the bladder, as shown in FIG. 7B. At that time, the bead 10a of the tire 10 is positioned and held on a fitting portion 26. After that, the center rod 16 is moved down, and air is introduced into the bladder 30 through a fluid passage at timing set relative to the moving-down of the center rod, so that the bladder 30 is expanded as a whole and the parts 46, 48 and so forth of the bladder are almost simultaneously brought into pressure contact with the inside surface of the unvulcanized tire 10, as shown in FIG. 7C. At that time, the pressure applied to the bladder 30 is about 0.1 to 0.2 kg/cm², and the time which it takes to preshape the unvulcanized tire 10 in the above-described process is 30 to 40 seconds as shown in FIG. 8B. However, the time for the preshaping may be optionally set. When the body 36 of the bladder 30 is in contact with the inside surface of the unvulcanized tire 10, nearly equal pressure acts to the corners 38, the oblique portions 40 and 42 and the curved portion 44 of the bladder body. The reference symbols for the parts of the tire 10 in FIG. 8A correspond to those in FIG. 8B.

Since the thickness of each of the corners 38 of the bladder 30 is relatively large, it is possible that the corners are brought into pressure contact with the beads 10a of the unvulcanized tire 10 slightly later than the other parts of the bladder are. However, since the first oblique portions 40, the second oblique portions 42, the curved portion 44 and the central part 48 of the bladder 30 are elongated by the introduction of the pressure fluid into it so that the portions 40, 42 and 44 and the part 48 are brought into pressure contact with the inside surface of the unvulcanized tire 10 earlier than the corners 38 of the bladder are, air moved out of the gap between the contact surfaces of the bladder and the tire because of the pressure contact of the corners 38, the first oblique portions 40, the second oblique portions 42 and the curved portion 44 with the tire flows out along the corners 38 corresponding to the beads 10a of the tire. Therefore, there is an advantage that the air is prevented from entering into the tire.

Figure 9:
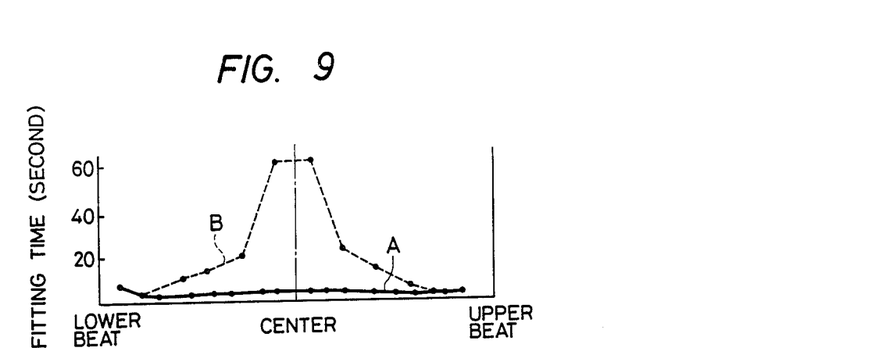
FIG. 9 shows diagrams for describing the time which it takes to bring each of the conventional bladder and the bladder which is the embodiment, into contact with the unvulcanized tire.
Figure 10:
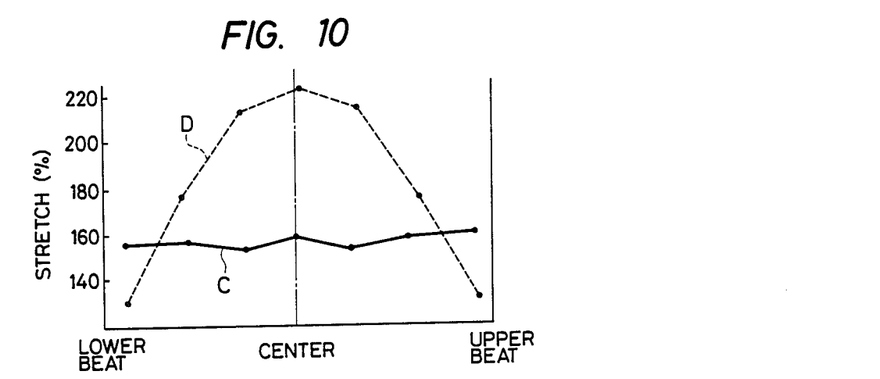
FIG. 10 shows diagrams for describing the degree of elongation of each of the portions of the conventional bladder and the bladder which is the embodiment.
Figure 11:
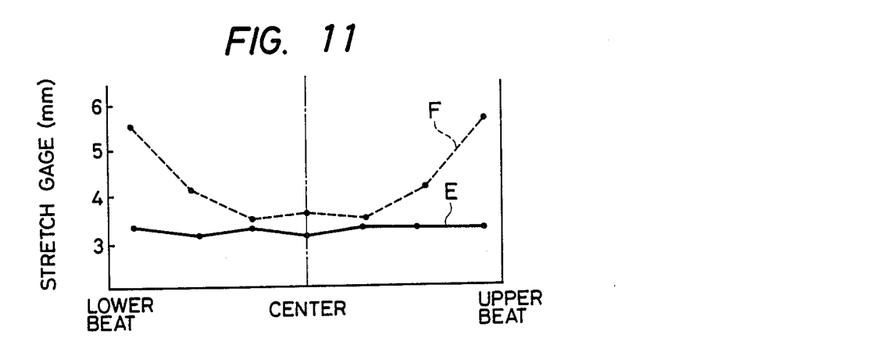
FIG. 11 shows diagrams for describing the thickness of each of the elongated conventional bladder and the elongated bladder which is the embodiment.

The results of an experiment in which the above-described bladder 30 was put into practical use to preshape the unvulcanized tire 10 are shown in FIGS. 9, 10 and 11 in comparison with those of an experiment in which a conventional bladder was put into practical use to preshape an unvulcanized tire. The unvulcanized tires used in the experiments were unvulcanized radial-ply tires TBR 10.00-20 for a truck and a bus. As shown by a dotted line B in FIG. 9, it took about 60 seconds to bring the central part of the conventional bladder into pressure contact with the unvulcanized tire after the corners of the bladder had been brought into pressure contact with the tire. In contrast, the parts of the bladder 30 provided in accordance with the present invention were almost simultaneously brought into pressure contact with the unvulcanized tire, and it was possible that the central part of the bladder was brought into pressure contact with the inside surface of the tire slightly earlier than the corners of the bladder were (refer to a full line A in FIG. 9). That was because the thickness of the bladder 30 was gradually decreased from the corners thereof to the central part 48 thereof to elongate the bladder in a well-balanced manner when the expanding fluid is introduced into it.

FIG. 10 shows the state of elongation of the bladder, in which the bladder was completely expanded to press the unvulcanized tire on the upper and the lower molds. A full line C in FIG. 10 indicates that the first oblique portions 40, the second oblique portions 42 and the curved portion 44 of the bladder 30 was elongated by about 160% equally to each other, namely, the body of the bladder 30 was almost uniformly elongated. However, a dotted line D in FIG. 10 indicates that the central part of the conventional bladder was elongated by about 220% but the corners of the conventional bladder, which corresponds to the beads of the unvulcanized tire, were elongated by only about 120 to 130%, namely, the bladder was nonuniformly elongated. For that reason, the conventional bladder was weak to repeated fatigue.

FIG. 11 shows the thickness of the bladder completely expanded to press the unvulcanized tire on the molds. A full line E in FIG. 11 indicates that the thickness of the bladder 30 provided in accordance with the present invention was about 3 to 4 mm between the central part of the bladder and the metal-clamped portion thereof. In contrast, a dotted line F in FIG. 11 indicates that the thickness of each corner of the conventional bladder, which corresponded to the bead of the unvulcanized tire, was as large as 5.5 mm but the thickness of the central part of the bladder was only 3 to 4 mm, namely, there was a large difference in the thickness of the conventional bladder in preshaping the unvulcanized tire. In other words, the thickness of each corner of the conventional bladder was so large as to delay the vulcanization of the tire. Therefore, there is a disadvantage that it takes a very long time to vulcanize the beads of the unvulcanized tire through the use of the conventional bladder. Since the central part of the conventional bladder is elongated more than the other parts thereof, the life of the conventional bladder is short.

Although the present invention is described above with reference to the preferred embodiment, the present invention is not confined thereto but may be otherwise embodied without departing from the character and spirit thereof.

What is claimed is:

1. An open-end bladder for vulcanizing a pneumatic tire, which has an annular form and a pair of openings extending through said bladder in the axial direction thereof and into which a pressure fluid is introduced to bring said bladder into pressure contact with the still unvulcanized tire to preshape said tire and to support said tire on the inside surface thereof at the time of said vulcanization, characterized in that said bladder comprises corners extending outward from both metal-clamped end portions having said openings, first oblique portions curved and extending outward from said corners, second oblique portions extending outward from said first oblique portions, and a convex portion curved and extending outward from said second oblique portions to the maximum-diameter cross section of said bladder to couple the upper and lower halves of said bladder to each other; and the thickness of said bladder is gradually decreased from the portions of said bladder, which correspond to the beads of said still unvulcanized tire, to the portion of said bladder, which corresponds to the tread of said still unvulcanized tire.

2. An open-end bladder according to the claim 1, in which the center of curvature of a curved portion which is the joint of the corner and the first oblique portion is located inside said bladder; the center of curvature of a curved portion which is the joint of said first oblique portion and the second oblique portion is located outside said bladder; and the center of curvature of the convex portion curved and extending outward from the second oblique portions and constituting the maximum-diameter portion of said bladder is located inside said bladder.

* * * * *